United States Patent [19]

Dill et al.

[11] Patent Number: 4,679,631

[45] Date of Patent: Jul. 14, 1987

[54] COMPOSITION AND METHOD OF STIMULATING SUBTERRANEAN FORMATIONS

[75] Inventors: Walter R. Dill; Michael L. Walker; William G. F. Ford, all of Duncan, Okla.

[73] Assignee: Halliburton Company, Duncan, Okla.

[21] Appl. No.: 882,127

[22] Filed: Jul. 3, 1986

[51] Int. Cl.$^4$ .................. E21B 43/26; E21B 43/27
[52] U.S. Cl. .................. 166/307; 166/308; 252/8.553
[58] Field of Search .................. 252/8.553; 166/271, 166/307, 308

[56] References Cited

U.S. PATENT DOCUMENTS

| | | |
|---|---|---|
| 2,175,079 | 10/1939 | Dow . |
| 2,175,081 | 10/1939 | Grebe . |
| 2,335,689 | 11/1943 | Morgan et al. .................. 252/8.553 |
| 2,867,279 | 1/1959 | Cocks .................. 252/8.553 X |
| 3,142,335 | 7/1964 | Dill et al. . |
| 3,150,081 | 9/1964 | Haslam . |
| 4,021,355 | 5/1977 | Holtmyer et al. .................. 166/308 X |
| 4,067,389 | 1/1978 | Savins .................. 166/308 X |
| 4,096,914 | 6/1978 | McLaughlin et al. .................. 252/8.553 X |
| 4,151,098 | 4/1979 | Dill et al. .................. 166/307 X |
| 4,167,214 | 9/1979 | Street, Jr. .................. 166/307 |
| 4,205,724 | 6/1980 | Swanson et al. .................. 252/8.553 X |
| 4,213,866 | 7/1980 | Ashby et al. .................. 252/8.553 |
| 4,317,735 | 3/1982 | Crowe .................. 166/307 X |
| 4,330,419 | 5/1982 | Hall et al. .................. 252/8.553 X |
| 4,574,050 | 3/1986 | Crowe et al. .................. 166/307 X |

*Primary Examiner*—George A. Suchfield
*Attorney, Agent, or Firm*—Robert A. Kent

[57] ABSTRACT

A method and composition for stimulating subterranean formations containing iron deposits. The composition comprises a compound comprising at least one member selected from the group consisting of dihydroxymaleic acid, salts of dihydroxymaleic acid and gluconodeltalactone. The method comprises contacting the subterranean formation in an appropriate manner with the above-described composition present in an amount sufficient to sequester iron.

20 Claims, No Drawings

COMPOSITION AND METHOD OF STIMULATING SUBTERRANEAN FORMATIONS

BACKGROUND OF THE INVENTION

1. Field of the Invention:

The present invention relates to the stimulating of subterranean formations surrounding oil wells, gas wells, water wells, injection wells and similar boreholes.

2. Brief Description of the Prior Art

The flow of oil from a subterranean formation to a well bore depends, among other factors, upon the permeability of the formation. Often permeability is not sufficient to allow a desired flow rate of fluids, such as, crude oil, natural gas and so forth from the formation. In such a case, the formation can be treated to increase its permeability.

Acid treating has been widely employed for carrying out the treatments in subterranean oil, gas, or water producing formations. Such acidizing treatments have been used primarily to increase the productivity of oil and gas from a calcareous formation by bringing about the removal of reactive materials from naturally occurring fractures and pore spaces in the formation whereby the sizes thereof are increased. The usual technique of acidizing the formation comprises introducing a non-oxidizing acid into the formation under sufficient pressure to force the acid into the formation where it reacts with acid soluble components of the formation and thereby enlarges the interstices of the formation with an attendant increase in permeability.

Acidizing fluids can also be utilized during the stimulation of a well to remove acid soluble scales present in the well bore or to dissolve fine particles which have been formed in the perforating process and are present in the vicinity of the well bore. Generally, this technique involves placing a small quantity of acid in a desired portion of the well bore and allowing the acid to react with the scale deposits that are desired to be removed. Alternatively, the acid may be circulated across the perforations or formation face to dissolve the unwanted deposits.

Hydraulic fracturing also can be employed to increase the production of fluids from a subterranean formation; and accordingly many methods and compositions useful for hydraulically fracturing a subterranean well formation penetrated by a well bore have been developed. Commonly, in the art of hydraulic fracturing, a fluid is introduced into the formation sought to be fractured by a conduit, such as tubing or casing, disposed in a well bore. The fluid is introduced at a rate and pressure sufficient to produce a fracture in the formation and to extend the produced fracture from the well bore into the formation. The fluid can include a propping agent, which results in placement of the propping agent within the fracture thus produced. Following the fracturing treatment, the introduced fluid is recovered from the formation, but the proppant remains in the produced fracture to thereby prevent the complete closure thereof and to form a conductive channel extending from the well bore into the formation. Combination fracture acidizing processes are well known in the art.

The presence of iron in subterranean formations presents a troublesome problem during the stimulation of the formations.

Whenever a formation containing iron salts or oxides is acidized, acid soluble iron compounds are dissolved at first by the acid; but such compounds remain dissolved in the acidic solution only as long as the pH is less than that at which they are normally precipitated. As the acid solution continues to act upon the calcareous deposits and becomes spent, the pH of the solution increases to about 4 to 5. Ferric iron compounds begin to precipitate at a pH of 2.5 and are precipitated when the pH is about 3.5. Thus, the acid solution when spent, no longer retains the ferric iron in the solution and the resulting iron precipitates often reduce permeability by objectionably plugging, clogging or otherwise obstructing the pore spaces and other openings providing fluid passageways in the well stratum.

A problem encountered in the fracturing of a subterranean formation is that the water which is present in the formation can contain dissolved ferrous ions. If the fracturing fluid that is injected into the formation contains oxygen, the oxygen will oxidize the dissolved ferrous ions to ferric ions and this results in precipitation of the ferric ions when the pH of the formation water is greater than 2.5. This, also causes objectionable plugging, clogging or obstruction of the pore spaces and other openings in the fluid passageways of the subterranean formation.

Still another problem encountered in stimulating a subterranean formation is the presence of iron in the aqueous fluids that are used for stimulating the formation. These aqueous fluids are frequently mechanically blended in order to insure proper mixing of the components in the fluid and are pumped into the subterranean formation. During the blending and pumping of the stimulating fluids, any ferrous ions present in these stimulating fluids may be oxidized to ferric ions. Since these ions begin to precipitate at a pH of about 2.5, and are precipitated when the pH is about 3.5, the stimulating fluid can deposit the ferric ions on the pore surfaces of the subterranean formation and thus cause low permeability of the formation.

In order to prevent the precipitation of the iron compounds from spent acidizing solutions, sequestering additives have heretofore been utilized in acidizing solutions. For example, acetic acid has been used as a pH control agent for keeping iron and the like in solution in spent acid. U.S. Pat. No. 3,142,335, which is assigned to the assignee of the present invention discloses an iron sequestering additive for use with hydrochloric acid solutions comprised of a mixture of citric acid or a salt thereof, and a low molecular weight organic acid or salt thereof, such as acetic acid or formic acid.

Numerous other patents disclose the use of chelating agents for preventing the deleterious effects of dissolved iron in well treatments involving aqueous strong acids. U.S. Pat. No. 2,715,081 discloses an acidizing composition made up of a strong mineral acid containing sulfurous acid, which prevents the precipitation of iron in the formation. U.S. Pat. No. 2,175,079 suggests that the inclusion within an acidizing fluid of a material such as lactic acid, ammonium acetate, glycine, glycolic acid, citric acid or the like keeps the iron compounds dissolved by the acid in the solution. U.S. Pat. No. 3,150,081 discloses the use of hydroxyacetic acid and citric acid to prevent the precipitation of iron during acidizing operations.

U.S. Pat. No. 4,574,050 discloses the use of ascorbic acid, erythorbic acid, their salts or γ-lactone of such acids to prevent the precipitation of iron during acidizing operations. It would be desirable to provide a composition and method for preventing the precipitation of iron during the stimulation of subterranean formations.

SUMMARY OF THE INVENTION

Surprisingly, it has been found that dihydroxymaleic acid and its salts, gluconodeltalactone or an admixture of dihydroxymaleic acid and its salts and gluconodeltalactone or boric acid and its salts in an aqueous stimulating fluid will reduce any ferric ions in the stimulating fluid to ferrous ions and scavenge the oxygen present in the aqueous fluid to prevent the oxidation of the ferrous ions to ferric ions and thus prevent the precipitation of iron on the pore surfaces of the subterranean formation.

DESCRIPTION OF THE PREFERRED EMBODIMENT

The present invention provides a new method of stimulating a subterranean formation employing a new and improved composition for stimulating the subterranean formation. Briefly, the formation stimulating fluid of the present invention is a composition having dihydroxymaleic acid or its salts or derivatives, gluconodeltalactone or an admixture of compounds comprising dihydroxymaleic acid or its salts and gluconodeltalactone or boric acid and its salts incorporated into the composition. The method of the invention comprises contacting the subterranean formation with the above-described composition.

One broad aspect of the invention comprises using the above-described composition in an aqueous fracturing fluid. In the practice of the invention, the dihydroxymaleic acid or its salts, gluconodeltalactone or admixture of dihydroxymaleic acid or its salts and gluconodeltalactone or boric acid and its salts are incorporated into an aqueous fracturing fluid and injected down the well at a pressure sufficient to fracture the formation employing conventional pumping equipment and procedures. If desired, the fracturing fluid used to practice the invention can be injected into a selected portion or portions of the formation. Said selected portion(s) of the formation can be isolated by applying one or more well packers at proper locations or by other methods known in the art.

Another embodiment of the invention comprises using the dihydroxymaleic acid or its salts, gluconodeltalactone or admixture of dihydroxymaleic acid or its salts and gluconodeltalactone or boric acid and its salts as sequestering additives in acidizing compositions and methods of acidizing subterranean well formations, which are very effective in preventing the precipitation of iron in the formations.

The acidizing compositions for stimulating subterranean formations containing iron deposits are comprised of aqueous acids to which the above-described sequestering agents are added. The above-described combinations of sequestering agents also are useful in aqueous fluids utilized to stimulate subterranean formations containing iron deposits.

As noted above, the dihydroxymaleic acid or its salts or derivatives, gluconodeltalactone or admixture of dihydroxymaleic acid or its salts or derivatives and gluconodeltalactone or boric acid and its salts are incorporated into the aqueous fracturing fluid in order to prevent the deposition of iron in the subterranean formation. In this connection, there is no upper or lower limits to the amount of these chemicals that can be added but generally a range of from about 2 pounds to 50 pounds per 1,000 gallons of aqueous fracturing fluid is preferred and, most preferably, from about 2 to about 30 pounds per 1,000 gallons of aqueous fracturing fluid. In most instances, from about 5 to 10 pounds per 1,000 gallons of fracturing fluid is sufficient to prevent the deposition of iron in the subterranean formation unless excessive aeration of the fracturing fluids occurs. A preferred admixture has a weight ratio of dihydroxymaleic acid or its salts to gluconodeltalactone in the range of from about 0.5 to 1 to about 2 to 1 and, most preferably, about 1 to 1. Another admixture has a weight ratio of dihydroxymaleic acid or its salts to boric acid or its salts in the range of from about 4 to 1 to about 20 to 1 and, most preferably, from about 9 to 1 to about 10 to 1.

The fracturing fluid used in carrying out the invention can be water or a water-based fracturing fluid containing a gelling agent to increase the viscosity of said fluid. These water-based fracturing fluids are well known to those skilled in the art and can comprise non-acidic, weakly acidic and acidic fluids. Thus, for example, the fracturing fluid can comprise an aqueous liquid, a gelling agent, and a crosslinking compound. Suitable gelling agents which can be employed are, for example, galactomannans such as guar gum, gum karaya, gum tragacanth, gum ghatti, gum acacia, gum konjak, shariz, locus, psyllium, tamarind, gum tara, carrageenin, gum kauri, modified guars such as hydroxypropylguar, hydroxyethylguar, carboxymethylhydroxyethylguar, carboxymethylhydroxypropylguar, cellulose ethers such as carboxyethylcellulose, carboxymethylcellulose (CMC), carboxymethylhydroxyethylcellulose (CMHEC), hydroxyethylcellulose, hydroxypropylcellulose, methylhydroxypropylcellulose, methylcellulose, ethylcellulose, propylcellulose, and hydroxypropylmethylcellulose, polyacrylamides, polyacrylates, polysaccharides and alkoxylated amines such as:

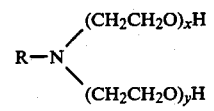

wherein R is selected from saturated and unsaturated aliphatic groups having the range of from about 8 to 22 carbon atoms and mixtures thereof and the average sum of the value of x and y in the mixture is in the range of about 0 to about 10. In addition, hydratable polymers capable of being crosslinked are suitable as gelling agents. Further details regarding the preparation and use of these polymers can be found in U.S. Pat. No. 4,021,355, the entire disclosure of which is incorporated by reference. A particularly effective gelling agent for carrying out the present invention is hydroxypropyl guar which may be crosslinked with a number of different crosslinking agents.

The amount of thickening or gelling agent used in the fracturing composition of the invention can vary widely depending upon the viscosity, grade and purity of the gelling agent and the properties desired in said composition. In general, the amount of thickening or gelling agent used will be in the range of from about 1 to about several hundred pounds per 1000 gallons of fluid and, normally, from about 10 to about 50 pounds per 1000 gallons of fluid. There is, however, really no limit on the amount of gelling or thickening agent which can be used as long as the gelled composition can be pumped in accordance with the method of the invention.

The fracturing fluids can be prepared by mixing a predetermined quantity of the compound selected from the group consisting of dihydroxymaleic acid or its salts, gluconodeltalactone or an admixture of dihydroxymaleic acid or its salts and gluconodeltalactone or boric acid and its salts with the fluid which is to be used in fracturing the formation.

If a crosslinked gel is to be used in the fracturing fluid for fracturing the formation, the crosslinked gel can be prepared for use by mixing a predetermined quantity of the gelling agent with a quantity of aqueous liquid to form a gel referred to herein as the base gel. Any conventional mixing apparatus can be employed for this purpose. In one embodiment, after the gelling agent and the aqueous liquid have been mixed for a time sufficient to form the base gel, the compound of the present invention is added to the base gel followed by the crosslinking compound. The mixture then is pumped into the well bore. Propping agents generally are added to the fracturing fluid. Propping agents which can be used in the practice of the invention include any of those known in the art, such as sand grains, walnut shell fragments, tempered glass beads, sintered bauxite, resin coated sand and the like.

The fracturing operations in accordance with the invention can be carried out in one or more stages. A stage can comprise the following steps. If desired, depending upon the well conditions, the injection of the aqueous fracturing fluid can be preceeded by a small slug of cleanup acid to remove scale, wax deposits, and so forth, and to clean the perforations. The cleanup acid, in order to keep the iron in solution, may contain the compound of the present invention to prevent the deposition of iron around the well bore. The fracturing fluid then is injected.

An acid injection can follow the injection of the fracturing fluid. The acid injection can be followed with an overflush of water to displace the acid. The second, and succeeding steps can comprise the same steps carried out in the same order. It is to be understood, however, that the fracturing is not limited to any particular combination of steps and the only essential step is the injection of the fracturing fluid under sufficient pressure to create the fracture.

Acidizing fluids used in carrying out the present invention are prepared in a similar manner. Any suitable aqueous acidic fluid such as are well known to those skilled in the art may be utilized.

The combination of low pH and the compound, namely dihydroxymaleic acid or its salts, gluconodeltalactone or an admixture of dihydroxymaleic acid or its salts and gluconodeltalactone or boric acid and its salts in the gelled fluids of the invention may increase the rate of degradation of the gelled fluids. It is, therefore, preferred that the gelled fluids be utilized as soon as possible after their preparation.

The composition of the present invention is a sequestering additive which prevents the deposition of iron in the pores of the formation during acidizing of the formation or removing acid soluble scale around the well bore.

The acidizing compositions of this invention for treating subterranean well formations containing iron compound deposits are comprised of an aqueous acid added to the above described sequestering agents.

The total amount of sequestering additive in the acidizing composition required to prevent precipitation of the iron compounds from the composition after becoming spent in the subterranean formation varies with the concentration of iron in the spent solution. However, in most applications, an additive concentration in the range of from about 2 pounds to about 150 pounds per 1,000 gallons of aqueous acid solution is sufficient and, preferably, from about 2 to about 35 pounds and, most preferably, from about 5 to about 20 pounds per 1000 gallons of aqueous acid solution.

The amount of the sequestering agent of the present invention is adjusted so that it is sufficient to substantially prevent the precipitation of the iron compounds from the spent aqueous acid solution and is sufficient to prevent the oxidation of ferrous ions to ferric ions in the composition of the invention. It is to be understood that the sequestering agent also may be used in combination with other compounds such as low molecular weight organic acids such as acetic acid, formic acid, citric acid, mixtures thereof and the like.

Acids useful in the practice of the invention include any non-oxidizing acid which is effective in increasing the flow of fluids, such as hydrocarbons, through the formation and into the well. Thus, under proper conditions of use, examples of such acids include inorganic acids such as hydrochloric acid, hydrofluoric acid and mixtures thereof and mixtures of these inorganic acids with organic acids such as acetic acid, formic acid and combinations of acetic acid or formic acid with citric acid or the like. The concentration or strength of the acid can vary depending upon the type of acid, the type of formation being treated, and the results desired in the particular treating operation. The concentration can vary from about 1 to about 40 weight percent with concentrations within the range of 1 to 30 weight percent usually preferred, based on the total weight of the acidic composition. When hydrochloric acid is used, it is presently preferred to use an amount that is sufficient to provide an amount of hydrochloric acid within the range of from about $7\frac{1}{2}$ to about 28 weight percent and, more preferably, about 15 weight percent based on the total weight of the acidic composition.

The acids used in the practice of the invention can contain any of the known corrosion inhibitors, de-emulsifying agents, surfactants, friction reducers, fluid-loss agents, gelling agents and the like which are known in the art.

While the manner of formulating and admixing the acidizing fluid is not believed critical, one method which may at times prove advantageous is to first add the sequestering agent to a predetermined quantity of water which is sufficient to dilute the acid to its desired strength for ultimate use. To this water is added the concentrated acid in such a manner as, for example, by agitation, to provide a uniform or homogeneous fluid; or if desired the sequestering agent can be added to the concentrated acid again in such a manner as, for example, by agitation to provide a uniform or homogeneous mixture and thereafter diluting the mixture with water to the desired strength prior to or at the time of application in the acidizing operation. Additional ingredients may be included in the fluid and may be added in any convenient manner in accordance with conventional practice. For example, gelling agents, corrosion inhibitors or deemulsifying agents and the like may be premixed either with the acid or with the sequestering agent or in an aqueous solution thereof prior to being formulated into the acidizing fluid of the desired strength that is to be utilized in the acidizing operation. As can be appreciated, the amounts of the sequestering agent and the strength of the acid can be varied to obtain optimum results for any given acidizing operation.

The acidizing fluid, that is the solution containing the acid and the sequestering agent of the present invention, can be used to increase and restore the permeability of a zone or formation by being introduced into the formation containing the calcareous deposits via an injection into the well in any convenient manner as understood in the acidizing art. After the injection of the fluid into the deposits, the fluid attacks the calcareous deposits. The reaction usually is completed within 1 to 4 hours of the injection and thereafter the spent fluid may be withdrawn by pumping, swabbing or allowing the well to flow. Additionally, when the well is a disposal or injection well, the acidizing fluid can be introduced into the well in any convenient manner as understood in this art with the acid contacting the structures or strata to be treated and thereafter the spent fluid is displaced into the structures or strata by a displacing fluid, usually water.

The compositions of the present invention can be prepared on the surface in a suitable tank equipped with a suitable mixing means, and then pumped down the well and into the formation employing equipment for pumping acidic compositions. It is within the scope of the invention to prepare the composition by any suitable means known in the art.

The specific ingredients and the specific amount of each ingredient used in the composition of the present invention will depend on a number of factors. Among the factors to be considered are temperature, pressure, composition of the subterranean formation, the relative cost of ingredients, the type of operation involved, and the amount of iron deposits likely to be encountered in the well itself or on the surfaces of the equipment in the well or mixing and pumping equipment utilized in introducing the treatment fluids into the well.

It is to be understood that while specific reference has been made to dihydroxymaleic acid, such reference is intended to mean an enollic acid containing four carbon atoms and includes isomers such as dihydroxyfumaric acid which is considered to be the same compound and is interchangeable with dihydroxymaleic acid for the purpose of iron retention.

In yet another embodiment of the invention, the sequestering agent of the present invention can be utilized in industrial cleaning applications such as, for example, in boiler cleaning, superheater cleaning, pipeline cleaning and the like where various alkaline or acidic cleaning fluids are utilized in contact with iron surfaces. The addition of the sequestering agent of the present invention to the cleaning fluid facilitates and enhances the rate of iron oxide scale removal from metal surfaces. The sequestering agent also reduces or substantially prevents ferric corrosion of equipment by reducing any ferric ions that are present to ferrous ions. The sequestering agent is utilized in an amount sufficient to effect an improved rate of iron oxide scale removal which generally will be an amount similar to that utilized in the acidizing fluids described hereinbefore. Such acidizing fluids are substantially similar to fluids often utilized in industrial cleaning applications. In many instances, various organic acids such as acetic acid, formic acid, citric acid and their salts may be utilized, as well as various mineral acids such as hydrochloric acid, sulfuric acid, phosphoric acid and the like are constituents of the industrial cleaning fluids.

The following examples will serve to illustrate the invention but should not be considered as unduly limiting the invention.

EXAMPLE I

In order to illustrate the advantageous use of the composition of the present invention, tests were carried out to compare the iron sequestering ability of various agents in acidic and non-acidic fluids. In preparing for these tests, samples of 15% hydrochloric acid solution containing the composition to be tested and the designated iron concentration (Fe+++) in solution were prepared and allowed to remain in contact with Iceland Spar or marble chips until spent. At the end of 24 hours, the solutions were analyzed, using standard techniques, to determine the amount of iron retained in the solution. The non-acid solutions were prepared from 2% KCl water. At the end of 24 hours, these solutions also were analyzed to determine the extent of iron reduction. The results are set forth in the following Tables I and II.

TABLE I

| Sample No. | Additive | Additive Concentration (lb/1000 gal fluid) | Temperature (°F.) | Pressure (psi) | Initial Iron in Solution (mpl Fe+++) | Comments |
|---|---|---|---|---|---|---|
| 1 | DHM[1] | 50 | 200 | 14.7 | 11,000 | Fe(III) ppt 15 min. |
| 2 | DHM | 50 | 200 | 14.7 | 10,000 | Fe(III) ppt 20 hrs. |
| 3 | DHM | 50 | 200 | 14.7 | 9,000 | Fe(III) ppt 48 hrs. |
| 4 | DHM | 50 | 200 | 14.7 | 8,000 | No Fe(III)[3] ppt >48 hrs. |
| 5 | DHM-GDL[2] (1:1) | 50 | 125 | 14.7 | 7,000 | Fe(III) ppt |
| 6 | DHM-GDL (1:1) | 50 | 125 | 14.7 | 6,500 | Fe(III) ppt |
| 7 | DHM-GDL (1:1) | 50 | 125 | 14.7 | 6,000 | No ppt >24 hrs. |
| 8 | DHM-GDL (1:1) | 50 | 200 | 14.7 | 6,000 | No ppt >24 hrs. |
| 9 | DHM-GDL (1:1) | 50 | 75 | 500.0 | 6,000 | No ppt >24 hrs. |
| 10 | DHM-GDL (1:1) | 50 | 125 | 500.0 | 6,000 | No ppt >24 hrs. |

TABLE I-continued (Acidic Fluids)

| Sample No. | Additive | Additive Concentration (lb/1000 gal fluid) | Temperature (°F.) | Pressure (psi) | Initial Iron in Solution (mpl Fe+++) | Comments |
|---|---|---|---|---|---|---|
| 11 | DHM-GDL (1:1) | 50 | 200 | 500.0 | 6,000 | No ppt >24 hrs. |
| 12 | DHM-GDL (1:1) | 50 | 275 | 500.0 | 6,000 | No ppt >24 hrs. |
| 13 | DHM-GDL (1:1) | 50 | 350 | 500.0 | 6,000 | No ppt >24 hrs. |
| 14 | DHM-Boric Acid (9:1) | 50 | 75 | 500.0 | 8,000 | No ppt >24 hrs. |
| 15 | DHM-Boric Acid (9:1) | 50 | 125 | 500.0 | 8,000 | No ppt >24 hrs. |
| 16 | DHM-Boric Acid (9:1) | 50 | 200 | 500.0 | 8,000 | No ppt >24 hrs. |
| 17 | DHM-Boric Acid (9:1) | 50 | 275 | 500.0 | 8,000 | Calcium oxalate ppt |

[1]Dihydroxymaleic acid
[2]Gluconodeltalactone
[3]Small amount of calcium oxalate precipitate was detected as tertiary reaction product.

TABLE II (Non-Acidic Fluids)

| Sample No. | Additive | Additive Concentration (lb/1000 gal fluid) | Temperature (°F.) | Pressure (psi) | Initial Iron in Solution (mpl Fe+++) | Comments |
|---|---|---|---|---|---|---|
| 1 | DHM[1] | 50 | 75 | 14.7 | 8,000 | No ppt. >24 hrs. |
| 2 | DHM | 50 | 125 | 14.7 | 8,000 | No ppt. >24 hrs. |
| 3 | DHM | 50 | 175 | 14.7 | 8,000 | No ppt. >24 hrs. |
| 4 | GDL[2] | 50 | 75 | 14.7 | 3,000 | No. ppt. >24 hrs. |
| 5 | GDL | 50 | 125 | 14.7 | 4,000 | No. ppt. >24 hrs. |
| 6 | GDL | 50 | 175 | 14.7 | 4,000 | No. ppt. >24 hrs. |

[1]Dihydroxymaleic acid
[2]Gluconodeltalactone

The results clearly demonstrate the ability of the composition of the present invention to retain iron in a solution. The composition of the present invention also substantially prevents undesirable precipitate formation of calcium compounds from spent acid fluids.

While the invention has been described in terms of certain embodiments, and illustrated by examples, the skilled artisan will readily appreciate that various modifications, changes, substitutions and omissions may be made without departing from the spirit thereof. Accordingly, it is to be understood that the scope of the present invention is defined in the following claims.

What is claimed is:

1. A method of treating a subterranean formation containing iron comprising contacting a subterranean formation with an aqueous fluid containing a compound consisting essentially of at least one member selected from the group consisting of dihydroxymaleic acid, salts of dihydroxymaleic acid, gluconodeltalactone present in an amount sufficient to substantially prevent the precipitation of ferric iron in said aqueous fluid during said contacting with said subterranean formation.

2. The method of claim 1 wherein said compound comprises an admixture of dihydroxymaleic acid or its salts and gluconodeltalactone in a ratio of dihydroxymaleic acid or salts to gluconodeltalactone, by weight, in the range of from about 0.5:1 to about 2:1.

3. The method of claim 1 wherein said compound comprises an admixture of dihydroxymaleic acid or its salts and gluconodeltalactone in a ratio of dihydroxymaleic acid or its salts to gluconodeltalactone, by weight, in the range of from about 1:1.

4. The method of claim 1 wherein said aqueous fluid contains a non-oxidizing acid.

5. The method of claim 1 wherein said compound comprises an admixture of dihydroxymaleic acid or its salts, boric acid or its salts in a ratio of dihydroxymaleic acid or salts to boric acid or salts, by weight, in the range of from about 4:1 to about 20:1.

6. A method of acidizing a subterranean formation comprising:
contacting said formation with an aqueous acidic composition comprising a non-oxidizing acid present in an amount of from about 1 to about 40 percent by weight and a sequestering agent consisting essentially of at least one member selected from the group consisting of dihydroxymaleic acid, salts of dihydroxymaleic acid and gluconodeltalactone, said sequestering agent being present in said aqueous acidic composition in an amount sufficient to sequester at least a portion of any ferric iron present.

7. The method of claim 6 wherein said non-oxidizing acid is selected from the group consisting of hydrochloric acid, hydrofluoric acid and mixtures thereof.

8. The method of claim 6 wherein said sequestering agent comprises an admixture of dihydroxymaleic acid or its salts and gluconodeltalactone in a ratio, by weight, in the range of from about 0.5:1 to about 2:1.

9. The method of claim 6 wherein said sequestering agent comprises an admixture of dihydroxymaleic acid or its salts and boric acid or its salts in a ratio, by weight, in the range of from about 4:1 to about 20:1.

10. The method of claim 6 wherein said sequestering agent is present in an amount of from about 2 to about 150 pounds per 1000 gallons of aqueous acidic composition.

11. A method of fracturing a subterranean formation comprising:
introducing into said formation an aqueous fracturing composition at a flow rate and pressure sufficient to produce at least one fracture in said formation, said fracturing composition comprising an aqueous fluid and a sequestering agent consisting essentially of at least one member selected from the group consisting of dihydroxymaleic acid, salts of dihydroxymaleic acid and gluconodeltalactone, said sequestering agent being present in an amount sufficient to sequester at least a portion of any ferric iron present.

12. The method of claim 11 wherein said aqueous fluid comprises a non-oxidizing acid.

13. The method of claim 12 wherein said non-oxidizing acid is selected from the group consisting of hydrochloric acid, hydrofluoric acid and mixtures thereof.

14. The method of claim 11 wherein said sequestering agent comprises an admixture of dihydroxymaleic acid or its salts and gluconodeltalactone in a ratio, by weight, in the range of from about 0.5:1 to about 2:1.

15. The method of claim 11 wherein said sequestering agent comprises an admixture of dihydroxymaleic acid or its salts and boric acid or its salts in a ratio, by weight, in the range of from about 4:1 to about 20:1.

16. The method of claim 11 wherein said sequestering agent is present in an amount of from about 2 to about 50 pounds per 1000 gallons of aqueous acidic composition.

17. The method of claim 11 wherein said aqueous fluid comprises a non-oxidizing acid present in said aqueous fluid in an amount of from about 1 to about 40 percent by weight.

18. The method of claim 11 wherein said aqueous fracturing composition contains a gelling agent.

19. The method of claim 18 wherein said gelling agent is selected from the group consisting of:
guar gum, gum karaya, gum tragacanth, gum ghatti, gum acacia, gum konjak, shariz, locus, psyllium, tamarind, gum tara, carrageenin, gum kauri, hydroxypropylguar, hydroxyethylguar, carboxymethylhydroxyethylguar, carboxymethylhydroxypropylguar, carboxyethylcellulose, carboxymethylcellulose (CMC), carboxymethylhydroxyethylcellulose (CMHEC), hydroxyethylcellulose, hydroxypropylcellulose, methylhydroxypropylcellulose, methylcellulose, ethylcellulose, propylcellulose, hydroxypropylmethylcellulose, polyacrylamides, polyacrylates, polysaccharides and alkoxylated amines having the general formula:

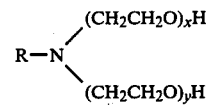

wherein R is selected from saturated and unsaturated aliphatic groups having the range of from about 8 to 22 carbon atoms and mixtures thereof and the average sum of the value of x and y in the mixture is in the range of about 0 to about 10.

20. The method of claim 11 wherein said aqueous fracturing composition is preceded with an acid flush said flush containing a non-oxidizing acid and an ingredient comprising at least one member selected from the group consisting of dihydroxymaleic acid, salts of dihydroxymaleic acid and gluconodeltalactone;
said acid flush containing a sufficient quantity of said ingredient to prevent the precipitation of iron.

* * * * *